United States Patent Office 2,992,984
Patented July 18, 1961

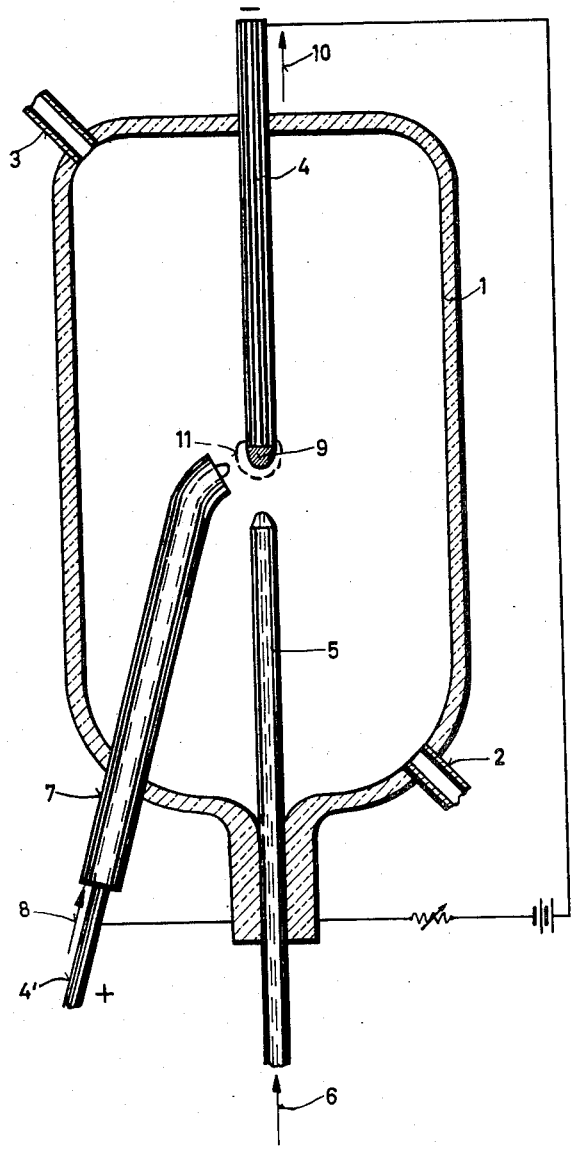

2,992,984
GAS DISCHARGE DEVICE FOR PRODUCING EXTREMELY PURE CRYSTALLINE SEMICONDUCTOR SUBSTANCES
Theodor Rummel, Munich, Germany, assignor to Siemens & Halske Aktiengesellschaft, Munich and Berlin, Germany, a corporation of Germany
Filed May 20, 1955, Ser. No. 509,980
Claims priority, application Germany June 12, 1954
2 Claims. (Cl. 204—325)

This invention is concerned with a gas discharge device for producing extremely pure crystalline semiconductor substances. The invention may be considered in the nature of a further development relating to the subject matter disclosed in copending application Ser. No. 464,129, filed October 22, 1954.

The copending application describes a process of and apparatus for preparing extremely pure crystalline semiconductor substances, particularly silicon, wherein a chemical compound of the substance to be produced is decomposed in gas phase by means of a gas discharge, the gas discharge conditions being such that the substance to be produced precipitates in crystalline form at gas discharge electrodes. As suitable chemical compound for obtaining purest silicon, there are particularly recommended halides, to which is added a reagent, for instance hydrogen, also in gas phase. The arrangement is such that on at least one electrode of the gas discharge, which may be referred to as receiving electrode, which is made of the substance to be produced, for instance silicon, there is formed a fusion zone at which the gas discharge primarily impinges causing it to function mainly in the form of a derived gas discharge in the manner of an arc discharge.

The object of the present invention is to increase the quantity of pure semiconductor material deposited or produced per unit of time in the process according to the copending application.

In accordance with the invention, this object is achieved by arranging the gas discharge means and the discharge conditions so as to operate with the lowest possible current density while at the same time forming a fusion zone and the gas discharge impinging thereon extending over an area of the electrode or electrodes which is as large as possible. It may thereby be of advantage to have the glow discharge cover a somewhat larger zone extending beyond the fusion zone. In order to obtain the largest possible amounts of the semiconductor material to be produced, in the form of thick bars or rods, the entire end surface of a receiving electrode should form a molten dome and the gas discharge should cover some of the rigid part thereof. By meeting these requirements, it is possible to obtain thick semiconductor rods or bars of a diameter of more than 1 centimeter.

In the process described in the previously mentioned copending application, the thickness of the semiconductor bar obtained may be under given discharge conditions proportional to the current applied. However, if the current density is at high current in accordance with the invention, as small as possible, the precipitation of the semiconductor material will be in spite of the high current accelerated because the heat of the fusion zone will not be excessively strongly concentrated and re-volatilization of the deposited substance will be avoided.

The desired discharge conditions are obtained among others by the use of a vacuum and it has furthermore been found advantageous to arrange the receiving electrode at which the precipitation takes place as vertically as possible, so that the fusion zone is formed at its lower end in the manner of a drop. Particularly favorable conditions are obtained by the use of direct current, in which case the precipitation or receiving electrode is connected as a cathode. The opposite electrode, that is, the anode, need not necessarily consist of silicon or the substance to be produced, but may be formed of metal. It is of advantage to cool the anode. It is moreover advantageous to cause a suitable stream of gas to flow around the anode in order to prevent the deposit on it of the semiconductor material which is to be produced.

In accordance with a particular object and feature of the invention, the gaseous chemical combination—which may also be a compound mixture—is directed against the precipitation or receiving electrode, particularly the cathode, either by a stream of gas or by the use of pressure by means of a nozzle, or else by the use of other suitable electrical or mechanical means.

In accordance with another object and feature of the invention known and suitable electrical and/or magnetic means, if desired auxiliary electrode means, may be provided for controlling the position and/or extent of the flaming discharge spot or the discharge glow surface. The discharge conditions may by such means be temporarily changed, for example, when it is desired to introduce into the discharge agents adapted in known manner to affect the content of impurity areas in the semiconductor, for example, to incorporate in the melt donors, acceptors, adherence areas, recombination centers or the like. By suitable and known means, the fusion zone as well as the surrounding gas may be agitated at least during the time of such incorporation of doping substances.

When using two-phase or multi-phase current for the operation of the gas discharge, the various electrodes upon which the substance which is to be obtained precipitates alternately in the difference phases, are advantageously arranged symmetrically and inclined somewhat with respect to the vertical direction so that the fusion zone at the lower end of the precipitation electrode is also developed depending therefrom in the fashion of a drop.

With the arrangement in accordance with the invention, there may be combined in suitable and known manner feeding and/or discharge means for the refining, addition, reaction or distillation substances and/or the like which are to be treated and worked in solid, liquid or gaseous form.

The accompanying drawing shows in simplified diagrammatic manner one embodiment of the invention.

In the drawing, numeral 1 is a gas discharge vessel of heat resistant material such as quartz or ceramic or of a metal which is neutral with respect to the semiconductor properties of the substance to be produced. The vessel has hollow walls (not shown for the sake of simplicity) and is provided with feed and discharge conduits 2 and 3 for the circulation of a cooling agent. Numeral 4 indicates the receiving electrode serving as cathode and made of the semiconductor material to be produced, for instance silicon. The other electrode 4' which, when operating with direct current, is connected as anode, is also made of silicon and is staggered somewhat with respect to the axis of rotation. A quartz tube 5 is provided for the introduction of the halide which is to be decomposed, particularly silicon chloroform or silicon tetrachloride and/or hydrogen which flows into the apparatus in the direction indicated by the arrow 6 and is decomposed by the gas discharge or thermal and/or electric action. In order to assist the decomposition, a reduction agent in the form of hydrogen is introduced in the direction indicated by the arrow 8 through an outer tube 7 partially surrounding the anode 4'. As a result of the gas discharge, a molten drop 9 forms at the lower end of cathode 4, in which drop the silicon particles separated from the chemical compound incorporate themselves and the cathode 4 is drawn upward in the direction of the arrow 10 by suitable and known means referred to in the copending application, comprising also suitable and known regulating means for maintaining the electrode spacing constant.

The dimensions of the two electrodes, of the nozzle of tube 5 and tube 7, as well as the gas pressure are such that the glow surface of the discharge acts approximately in the shape 11 indicated by the dotted line, the hydrogen flowing around the tip of the anode 4' so that no silicon is precipitated on this electrode.

The drawing shows only the essence of the invention, namely, in simplified manner the reaction vessel and the electrodes as well as gas flow and coolant flow means. Extraneous parts may conform to those shown and described in the copending application. Suitable and known means may be used throughout for accomplishing the intentions and purposes of the invention referred to in the foregoing description and defined in the appended claims.

Changes may be made within the scope and spirit of the appended claims.

I claim:

1. Apparatus for producing rodlike extremely pure semiconductor bodies by chemical decomposition of a gaseous semiconductor compound in a gas discharge to liberate pure semiconductor substance therefrom for deposit of such substance upon a carrier therefor, comprising a reaction vessel, a rodlike electrode extending downwardly into said vessel and constituting a carrier at the lower end portion thereof for the substance to be deposited, a second electrode extending into said vessel with the inner end portion thereof extending toward, but spaced from the inner end of said carrier electrode and forming a discharge gap therewith, a first conduit extending into said vessel having an outlet therein which is disposed adjacent such gap operative to discharge a gaseous semiconductor compound in the direction of and against the lower end portion of said carrier electrode, the latter electrode being axially movable relative to the adjacent vessel wall and the second electrode to enable the withdrawal of said carrier electrode in accordance with the deposit of semiconductor substance at the lower end thereof comprising a molten zone, a second conduit associated with said vessel for supplying a reaction agent to the vessel interior, said vessel having an outlet therein for the discharge of other reaction products, and means for connecting said carrier electrode and said second electrode in circuit with an electric current source to produce a gas discharge effective over the molten zone at the lower end portion of said carrier electrode, whereby semiconductor substance will be continuously deposited, in the form of a molten drop on the inner end face of the carrier electrode to produce semiconductor material in the shape of an elongated rodlike member, said second conduit enveloping part of said second electrode for conducting a reaction agent to said gap with such agent flowing about the inner end of said second electrode and preventing deposit of liberated semiconductor substance thereon.

2. Apparatus for producing rodlike extremely pure semiconductor bodies by chemical decomposition of a gaseous semiconductor compound in a gas discharge to liberate pure semiconductor substance therefrom for deposit of such substance upon a carrier therefor, comprising a reaction vessel, a rodlike electrode extending substantially vertically downwardly into said vessel and constituting a carrier at the lower end portion thereof for the substance to be deposited, a second electrode extending into said vessel with the inner end portion thereof extending toward, but spaced from the inner end of said carrier electrode and forming a discharge gap therewith, a first conduit extending into said vessel substantially vertically upwardly along a common axis with said carrier electrode, said first conduit having an outlet which is disposed adjacent said discharge gap operative to discharge a gaseous semiconductor compound in the direction of and against the lower end portion of said carrier electrode, the latter electrode being axially movable relative to the adjacent vessel wall and the second electrode to enable the withdrawal of said carrier electrode in accordance with the deposit of semiconductor substance at the lower end thereof comprising a molten zone, a second conduit associated with said vessel for supplying a reaction agent to the vessel interior, said vessel having an outlet therein for the discharge of other reaction products, and means for connecting said carrier electrode and said second electrode in circuit with an electric current source to produce a gas discharge effective over the molten zone at the lower end portion of said carrier electrode, whereby semiconductor substance will be continuously deposited, in the form of a molten drop on the inner end face of the carrier electrode to produce semiconductor material in the shape of an elongated rodlike member, said second conduit enveloping part of said second electrode for conducting a reaction agent to said gap with such agent flowing about the inner end of said second electrode and preventing deposit of liberated semiconductor substance thereon.

References Cited in the file of this patent

UNITED STATES PATENTS 2,468,175    Cotton _____ Apr. 26, 1949